M. W. FRANKLIN.
LUBRICATOR.
APPLICATION FILED APR. 5, 1918.
1,325,563.
Patented Dec. 23, 1919.
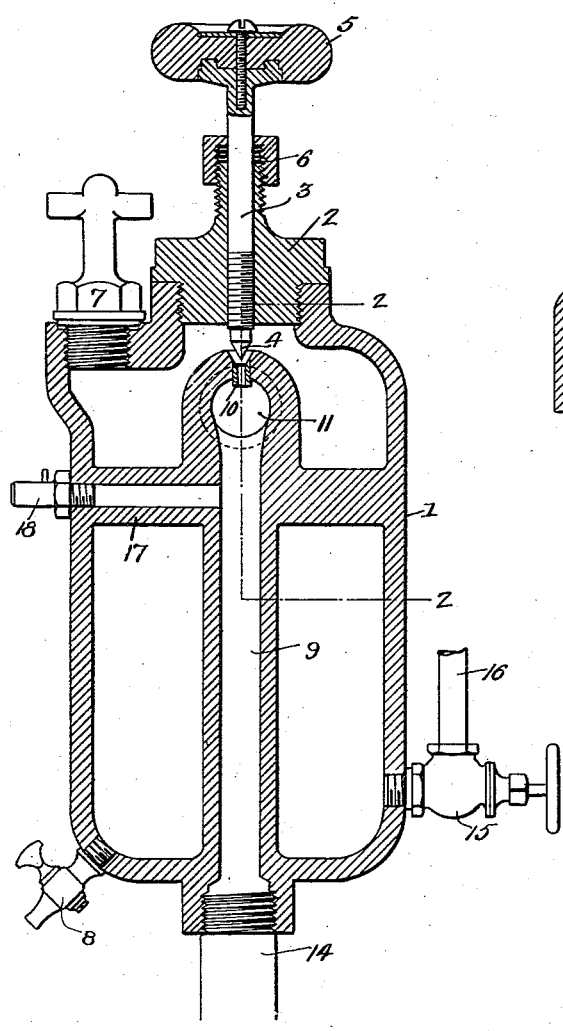
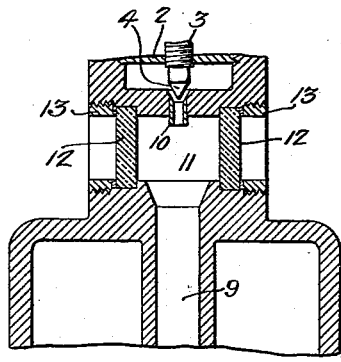
Inventor,
Milton W. Franklin,
by his Attorneys,
Howson & Howson

UNITED STATES PATENT OFFICE.

MILTON W. FRANKLIN, OF PHILADELPHIA, PENNSYLVANIA, ASSIGNOR TO E. F. HOUGHTON & COMPANY, OF PHILADELPHIA, PENNSYLVANIA, A CORPORATION OF PENNSYLVANIA.

LUBRICATOR.

1,325,563.　　　　Specification of Letters Patent.　　Patented Dec. 23, 1919.

Application filed April 5, 1918. Serial No. 226,820.

*To all whom it may concern:*

Be it known that I, MILTON W. FRANKLIN, a citizen of the United States, residing in Philadelphia, Pennsylvania, have invented Lubricators, of which the following is a specification.

One object of my invention is to provide a device particularly adapted to feed lubricants in solid form to a steam line or the like, the arrangement of parts being such that the lubricant will be liquefied so as to be capable of delivery at any desired rate.

It is further desired to provide a lubricator of a simple and substantial construction especially designed to insure heating of the lubricant in the immediate vicinity of the flow-controlling valve, the invention contemplating such an arrangement of parts as will permit of the observation of the rate at which the liquefied lubricating material is delivered to the tube whereby it is conveyed to the engine, pipe line or other structure to be supplied.

I further desire to provide a lubricator in which the valve for controlling the flow of the liquefied lubricant shall be so situated that the lubricant in its vicinity shall certainly be in liquid form in order that its passage through the valve shall be insured even though the latter be opened to but a small extent.

These objects and other advantageous ends I secure as hereinafter set forth, reference being had to the accompanying drawings, in which—

Figure 1 is a vertical section of a lubricator constructed according to my invention; and Fig. 2 is a fragmentary vertical section on the line 2—2, Fig. 1.

In the above drawings, 1 represents the body of a container or cup shown as made of a metal casting, having a top opening normally closed by a cover in the form of a plug 2 threaded into it. This plug has a central threaded passage for the reception of a threaded valve stem 3 provided with a conical valve 4 on its lower end and having an operating handle 5 on its upper end, the cover being provided with a stuffing box 6 to prevent leakage around said stem. The cup 1 is also provided with a filling opening normally closed by a threaded plug 7 and at its bottom has an outlet closed by a blow-off cock 8.

Centrally mounted within the cup so as to extend from the bottom vertically upward to within a short distance of the cover 2, is a tube 9 preferably made integral with the cup body and having at its top a valve seated opening designed to be closed by the valve 4 of the stem 3. Said opening has mounted in it a bushing 10 serving as a valve seat and the tube below and adjacent said seat is laterally extended in both directions to and through the side walls of the cup to provide an observation chamber 11 whose ends are closed by plates 12 of glass or other transparent material held in place by threaded bushings 13 in order to render visible the flow of material through the valve seat 10.

The lower end of the tube 9 has connected to it a conduit 14 leading to the engine, steam main, etc., to be supplied with lubricant and adjacent the bottom of the cup 1 there is an opening for the connection of a valve 15 forming part of a conduit 16 leading from a point in the steam line above the lubricator. In addition there is a lateral conduit 17 integral with the tube 9 and cup body 1, leading from the upper part of said tube to and opening on the side of the lubricator, where it has threaded into it an air relief valve 18.

If it be assumed that the valve 4 is closed, *i. e.*, is engaged with its seat bushing 10, and that the inlet pipe 16 is connected to a steam line as required, then with the valve 15 closed, the plug 7 may be unscrewed and the cup filled with solid grease or other lubricant. After the plug 7 has been replaced, the valve 15 is opened and steam under pressure is admitted from the steam line or engine through the pipe 14. The heat of this steam will shortly liquefy the otherwise solid lubricant in the cup, and owing to the cooling effect of the air upon the pipe 16, the steam therein will condense so that there will be in said pipe a body of water in communication with the lower part of the cup 1 and supporting the melted lubricant therein.

The latter is maintained in a melted, highly heated condition by reason of the steam supplied to the interior of the tube 9 from the pipe 14, so that when the valve 4 is opened by turning the handle 5 and stem 3, the water in the pipe 16 will act to cause the liquefied lubricant to enter and pass through the bushing 10 into the upper part of the tube 9 at a rate observable through the window plates 12 and dependent upon the amount of opening of said valve. It is noted that the upper part of the tube 9 as well as the valve 4 and its seat bushing 10 are at all times maintained in a highly heated condition owing to the presence of the steam in said tube so that there is no possibility of the relatively restricted passage controlled by the valve becoming clogged by the lubricant which in liquid form passes into the pipe 14 and thence to the engine, steam line, or other device to be supplied.

When all of the lubricant has been discharged from the cup, the cock 8 is opened to blow off the accumulated water, after which the valves 15 and 4 are closed and the plug 7 removed to permit the introduction of a new supply of lubricant.

I claim:

1. The combination in a lubricator of a cup; means for supplying water to the lower part of said cup; a delivery tube extending centrally upward from the bottom of the cup to the top thereof and having an inlet opening at its upper end; a conduit leading laterally from the upper part of the tube and opening on the side of the cup; a relief valve for said conduit, and a valved stem extending through the top of the cup in position to coact with said inlet opening to control the flow of lubricant into the tube.

2. In combination in a lubricator of a cup having at least two openings into its lower part; a tube extending upwardly from one of said openings so as to be spaced away from the sides of the cup and having lateral extensions at its upper end within said cup opening on said sides; transparent covers for the openings into said lateral extensions; with a valved stem extending through the top of the cup and coöperating with a valve seated opening in the upper end of the tube to control the flow of lubricant thereto.

3. The combination in a lubricator of a cup having at least two openings into its lower part; a tube extending upwardly from one of said openings so as to be spaced away from the sides of the cup and having lateral extensions at its upper end opening on said sides; transparent covers for the openings into said lateral extensions; a valved stem extending through the top of the cup and coöperating with a valve seated opening in the upper end of the tube to control the flow of lubricant thereto; a conduit connected to the upper part of the tube; and a relief valve for said conduit.

4. The combination in a lubricator of a container having adjacent its upper part a transversely extending conduit including a tube extending vertically downward to the bottom and spaced away from the walls of said container, there being a valve seated opening into said conduit substantially in line with the vertical extension; a stem adjustably mounted in the top of the container; a handle for the stem; a valve mounted on the stem within the container in position to coöperate with the valve seat of the opening to control the flow of lubricant into the tube; and a valved conduit connected to the bottom of the container for delivering water thereto.

In witness whereof I affix my signature.

MILTON W. FRANKLIN.